E. L. MEYER.
Sewer-Basins.
No. 150,072. Patented April 21, 1874.
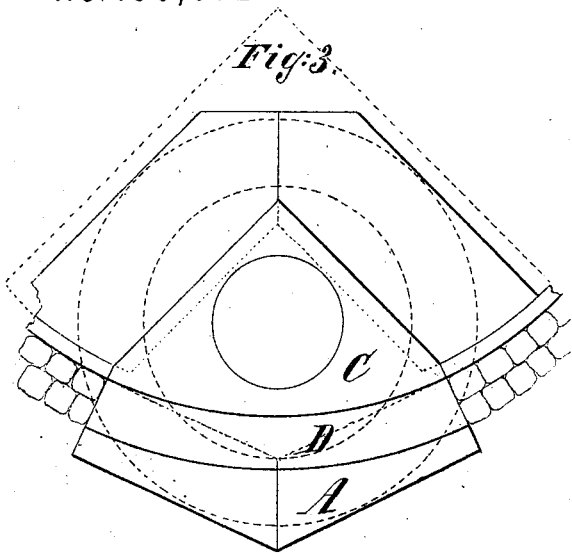
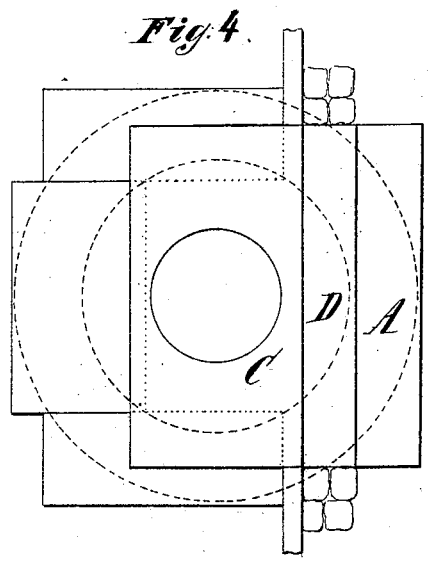
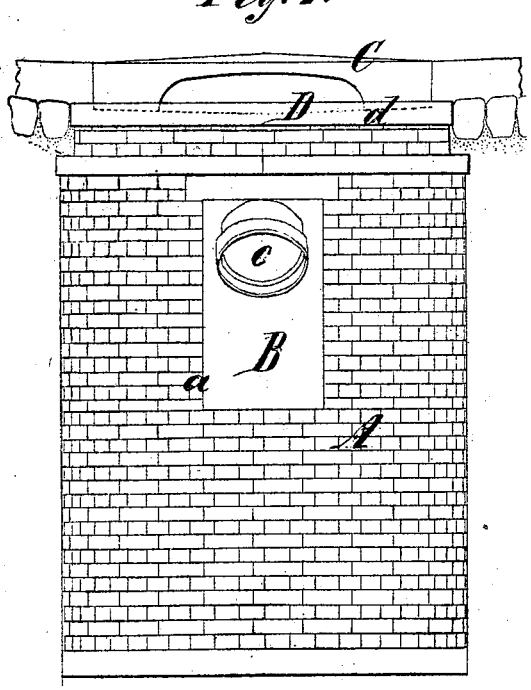
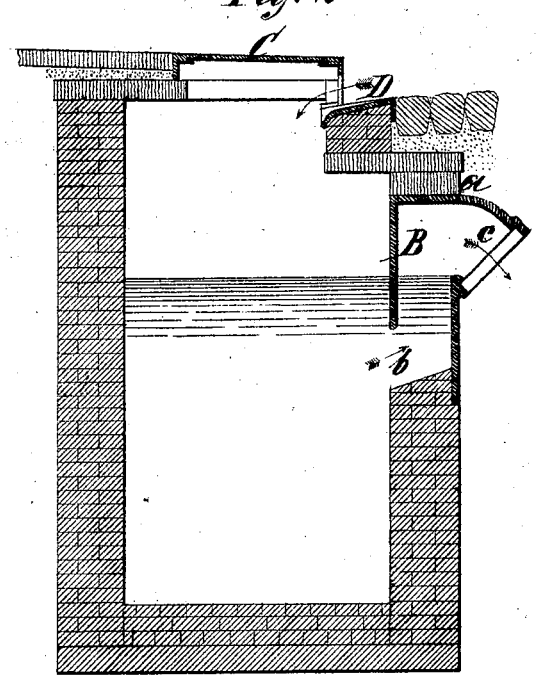
Witnesses: Inventor.

UNITED STATES PATENT OFFICE.

ERNEST L. MEYER, OF ELIZABETH, NEW JERSEY.

IMPROVEMENT IN SEWER-BASINS.

Specification forming part of Letters Patent No. 150,072, dated April 21, 1874; application filed February 26, 1874.

*To all whom it may concern:*

Be it known that I, ERNEST L. MEYER, of Elizabeth, in the county of Union and State of New Jersey, have invented a new and useful Improvement in Sewer-Basins; and I do hereby declare the following to be a full, clear, and exact description thereof, which will enable those skilled in the art to make and use the same, reference being had to the accompanying drawing forming part of this specification, in which drawing—

Figure 1 represents a front view of my invention. Fig. 2 is a vertical section of the same. Fig. 3 is a plan or top view of the same. Fig. 4 is a plan of a modification of the same.

Similar letters indicate corresponding parts.

This invention consists in combining, with a metallic basin-head, a metallic flanged gutter-plate, the flange of which overlaps the edge of the basin, and assists in forming a close and level joint with the pavement.

In the drawing, the letter A designates a sewer-basin, which is, by preference, built up of brick in a cylindrical or in any other desirable form or shape. In the wall of this basin is an aperture, *a*, for the reception of the trap B, which is made of cast-iron, clay, or any other suitable material, vitrified clay, such as used for sewer-pipes, being used by preference. This trap is made in such a form that when it is inserted in the basin its inner wall is flush with the inner, and its outer wall with the outer, surface of the basin, as shown in Fig. 2, and the lower part of the trap is let into the outer wall of the basin, so that said trap is firmly retained in position. In the inner wall of the trap, near its bottom edge, is an aperture, *b*, and from the outer wall, at or near its top edge, projects a spout, *c*, which leads into the sewer, so that the liquid which accumulates in the basin A can freely flow out into the sewer, while the mud and dirt which are swept into the basin accumulate in its lower part, whence they have to be removed from time to time. The liquid accumulates in the basin until it covers the aperture *b* in the inner wall of the trap, and the entrance of noxious gases from the sewer is prevented.

By this trap the interior room of the basin is left entirely unobstructed, and the operation of cleaning out said basin can be performed without difficulty.

The basin-head C is, by preference, made of cast-iron, either triangular, as shown in Fig. 3, or quadrangular, as shown in Fig. 4. If it is made triangular, the operation of adjusting the adjoining flag-stones of the sidewalk is facilitated. With this basin-head is combined a gutter-plate, D, which is cast of iron or made of any suitable material, and which is placed on the top edge of the basin, being provided with a flange, *d*, that overlaps said top edge, and allows of adjusting the adjoining paving-blocks with nicety, as indicated in Fig. 2. The inner edge of said gutter-plate is turned down, so as to retain the inner edge of the basin-wall in position, and form a free and unobstructed passage from the gutter into the basin.

What I claim as new, and desire to secure by Letters Patent, is—

The combination of the flanged gutter-plate D with the basin-head C and basin A, substantially as set forth.

ERNEST L. MEYER.

Witnesses:
W. HAUFF,
E. F. KASTENHUBER.